Patented May 26, 1925.

1,539,799

UNITED STATES PATENT OFFICE.

LUDWIG BENDA, OF MAINKUR, NEAR FRANKFORT-ON-THE-MAIN, AND OTTO SIEVERS, OF FECHENHEIM, NEAR FRANKFORT-ON-THE-MAIN, GERMANY.

PROCESS FOR THE PRODUCTION OF 4-AMINO-3-HYDROXYBENZENE-1-ARSONIC ACIDS.

No Drawing.   Application filed July 7, 1924. Serial No. 724,656.

*To all whom it may concern:*

Be it known that we, LUDWIG BENDA, a citizen of the Swiss Confederation, residing at Mainkur, near Frankfort-on-the-Main, Germany, and OTTO SIEVERS, a citizen of the Free State Hesse, residing at Fechenheim, near Frankfort-on-the-Main, Germany, have invented a new Process for the Production of 4-Amino-3-Hydroxybenzene-1-Arsonic Acids, of which the following is a full description.

The 4-amino-3-hydroxybenzene-1-arsonic-acid

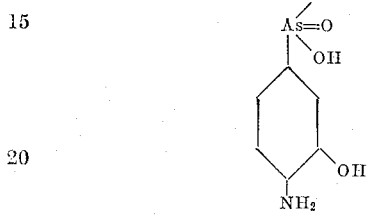

could hitherto only be produced in a difficult manner. (Benda B. B. 44.3578/1911).

We have found that the compound, of importance as a chemotherapeutic, as well as a starting material for the production of other medical preparations, is formed in a simple manner, if the benzoxazolon-6-arsonic acid described in our application filed by us in the United States Patent Office on the 7th day of July, 1924, Serial No. 724655 (production of benzoxazolon-6-arsonic acids by reducing 6-nitrobenzoxazolons and transforming the amino compounds thus obtained into the arsonic acids by diazotization reaction) is heated with alkalies; the splitting of the benzoxazolon ring hence is brought about without an alteration in the remaining arsonic acid. The reaction above described is represented by the following equation:

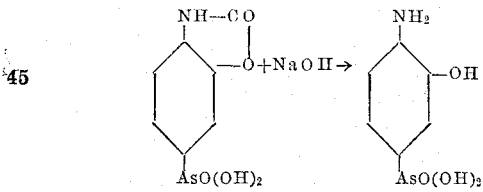

This fact could not be foreseen. A solution about thrice normal is advantageously used, as the yield and the purity suffer if weaker or stronger concentrations are applied.

In the same manner as the benzoxazolon-6-arsonic acid new homologues and substitution products of the same, as for instance the 5-methylbenzoxazolon-6-arsonic acid and the 5-chlorobenzoxazolon-6-arsonic acid, see our application cited above, may be transformed into the aminohydroxy-benzene arsonic acids of the formula:

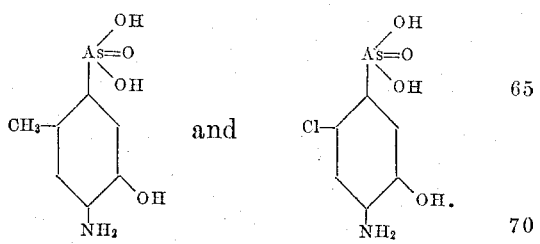

*Example 1.*

5 kilos benzoxazolon-6-arsonic acid are boiled for 5½ hours with 40 kilos caustic soda solution thrice normal (sand bath); after cooling down the solution which is but slightly colored is congo-acidified with hydrochloric acid ten times normal; on cooling down, the known 4-amino-3-hydroxy-benzene-1-arsonic acid is separated in nearly pure crystals.

*Example 2. 4-amino-3-hydroxy-6-methyl-benzene-1-arsonic acid.*

5.5 kilos 5-methylbenzoxazolon-6-arsonic acid are boiled for 3½ hours on the sand bath with 40 kilos caustic soda solution thrice normal; after cooling down, the solution is slightly congo-acidified with hydrochloric acid ten times normal and filtered. On cooling down the raw product separates as a slightly yellowish powder, which is recrystallized from water. The 4-amino-3-hydroxy-6-methyl-benzene-1-arsonic acid dissolves easily in dilute mineral acids and alkalies. The substance is very sparingly soluble in organic solvents with the exception of methyl alcohol in which it dissolves perceptibly. It is diazotizable; the yellow diazo solution if coupled with resorcinol yields a violet red dyestuff.

*Example 3. 4-amino-3-hydroxy-6-chloro-benzene-1-arsonic acid.*

50 kilos 5-chlorobenzoxazolon-6-arsonic acid are boiled for 5 hours with 100 litres water and 50 kilos caustic soda solution 38° Bé. with the reflux condenser. The solution after cooling down is very slightly acidulated with concentrated hydrochloric acid; it is allowed to stand for 24 hours at 0° stirring now and again, whereby the arsonic acid is precipitated as a heavy crystalline powder.

The 4-amino-3-hydroxy-6-chlorobenzene-1-arsonic acid dissolves in water and methyl alcohol, somewhat more difficultly in alcohol and acetone, it is unsoluble in ether and benzol. It is easily soluble in alkalies and carbonates of alkali metals. Its diazo-compound, which is of a dark yellow color, yields with resorcinol a red dyestuff.

Having now particularly described and ascertained the nature of our said invention and in what manner the same is to be performed, we declare, that what we claim is:

1. Process for the production of ortho-amino-hydroxybenzene-arsonic acids by heating benzoxazolon-arsonic acids with alkalies.

2. Process for the production of 4-amino-3-hydroxybenzene-1-arsonic acid, by heating benzoxazolon-6-arsonic acid with alkalies.

In witness whereof we have hereunto signed our names this 19th day of June, 1924.

LUDWIG BENDA.
OTTO SIEVERS.

Witnesses:
 JANE GUISTI,
 CRIKA JAEGER.